United States Patent
Agostino et al.

(10) Patent No.: US 7,566,000 B2
(45) Date of Patent: Jul. 28, 2009

(54) METHOD AND SYSTEM FOR PROVIDING A FLEXIBLE PRODUCT PURCHASE ACCOUNT FOR MEMBERS OF A HEALTHCARE ORGANIZATION

(75) Inventors: Michael Agostino, Grayslake, IL (US); Scott A. McArthur, Lake Villa, IL (US); Doug Egan, Grayslake, IL (US)

(73) Assignee: Walgreen Co., Deerfield, IL (US)

( * ) Notice: Subject to any disclaimer, the term of this patent is extended or adjusted under 35 U.S.C. 154(b) by 0 days.

(21) Appl. No.: 11/060,158

(22) Filed: Feb. 17, 2005

(65) Prior Publication Data

US 2005/0178828 A1 Aug. 18, 2005

Related U.S. Application Data

(60) Provisional application No. 60/545,200, filed on Feb. 17, 2004.

(51) Int. Cl.
*G06K 7/10* (2006.01)
(52) U.S. Cl. .................................... 235/375; 235/383
(58) Field of Classification Search ............... 235/375, 235/380, 383, 385, 487, 492
See application file for complete search history.

(56) References Cited

U.S. PATENT DOCUMENTS

| 5,424,524 | A  | * | 6/1995  | Ruppert et al. ............. 705/8   |
|-----------|----|---|---------|-------------------------------------|
| 5,478,989 | A  | * | 12/1995 | Shepley ...................... 235/375 |
| 5,649,118 | A  |   | 7/1997  | Carlisle et al.                     |
| 5,830,068 | A  | * | 11/1998 | Brenner et al. ............... 463/42 |
| 6,837,436 | B2 | * | 1/2005  | Swartz et al. .......... 235/472.02  |
| 7,225,253 | B2 |   | 5/2007  | Ofir et al.                         |
| 2002/0032582 | A1 | * | 3/2002 | Feeney et al. .................. 705/2 |
| 2002/0087444 | A1 |   | 7/2002 | DiPiero et al.                     |
| 2002/0103680 | A1 | * | 8/2002 | Newman ....................... 705/4 |
| 2002/0147617 | A1 |   | 10/2002 | Schoenbaum et al.                |
| 2002/0147678 | A1 |   | 10/2002 | Drunsic                           |
| 2002/0198831 | A1 | * | 12/2002 | Patricelli et al. ............... 705/40 |
| 2003/0061153 | A1 | * | 3/2003 | Birdsong et al. ............... 705/39 |
| 2003/0200118 | A1 |   | 10/2003 | Lee et al.                        |
| 2004/0049427 | A1 |   | 3/2004 | Tami et al.                       |
| 2004/0073457 | A1 | * | 4/2004 | Kalies ........................... 705/2 |
| 2004/0073465 | A1 |   | 4/2004 | Wilson                            |
| 2004/0078234 | A1 | * | 4/2004 | Tallal, Jr. ...................... 705/2 |
| 2005/0055272 | A1 | * | 3/2005 | Ryan et al. .................... 705/14 |

* cited by examiner

*Primary Examiner*—Daniel St.cyr
(74) *Attorney, Agent, or Firm*—Francis C. Kowalik; Randall G. Rueth; Marshall, Gerstein & Borun LLP

(57) ABSTRACT

A method and system for facilitating a redemption of benefits for a customer with the use of a benefit card is provided that includes associating an identification code with the customer, the identification code being stored on the benefit card, accessing an account record associated with the identification code, and determining if an item presented for purchase by the customer is eligible for a benefit discount. Also included is calculating an appropriate discount for the item if it is determined that the item was eligible for a benefit discount.

12 Claims, 11 Drawing Sheets

US 7,566,000 B2

METHOD AND SYSTEM FOR PROVIDING A FLEXIBLE PRODUCT PURCHASE ACCOUNT FOR MEMBERS OF A HEALTHCARE ORGANIZATION

CROSS-REFERENCE TO RELATED APPLICATIONS

This application claims benefit of the following U.S. Provisional Applications: Ser. No. 60/545,200, entitled "Method And System For Providing A Flexible Product Purchase Account For Members Of A Healthcare Organization" filed Feb. 17, 2004 the disclosure of which is hereby expressly incorporated herein by reference.

TECHNICAL FIELD

The present patent relates generally to techniques for facilitating the redemption of benefits provided by an employer or a managed care provider to allow an employee or member to purchase items from a retail store with the use of a benefit card.

BACKGROUND

Many managed healthcare providers offer their members discounts on prescription drugs. However, only a few managed healthcare providers also offer their members discounts for Over The Counter (OTC) drugs. Therefore, it is common for members to go to the emergency room for ailments such as runny noses and coughs. These visits and often the pharmaceuticals prescribed in those visits are typically very expensive and are often covered by the managed healthcare providers.

It is believed that many of these visits and their associated costs could be eliminated if the members were given a fixed monthly dollar amount to spend on OTC products, such as OTC cough syrups, antihistamines, aspirins, etc. The few managed healthcare providers that offer OTC benefits to their members have traditionally attempted to accomplished this using paper vouchers or forms that were given to the members and redeemed at the retail stores. These traditional methods were often fraught with mistakes and did not provide the ability to offer any reporting capabilities associated with the methods.

DETAILED DESCRIPTION OF VARIOUS EMBODIMENTS

Figure 1:
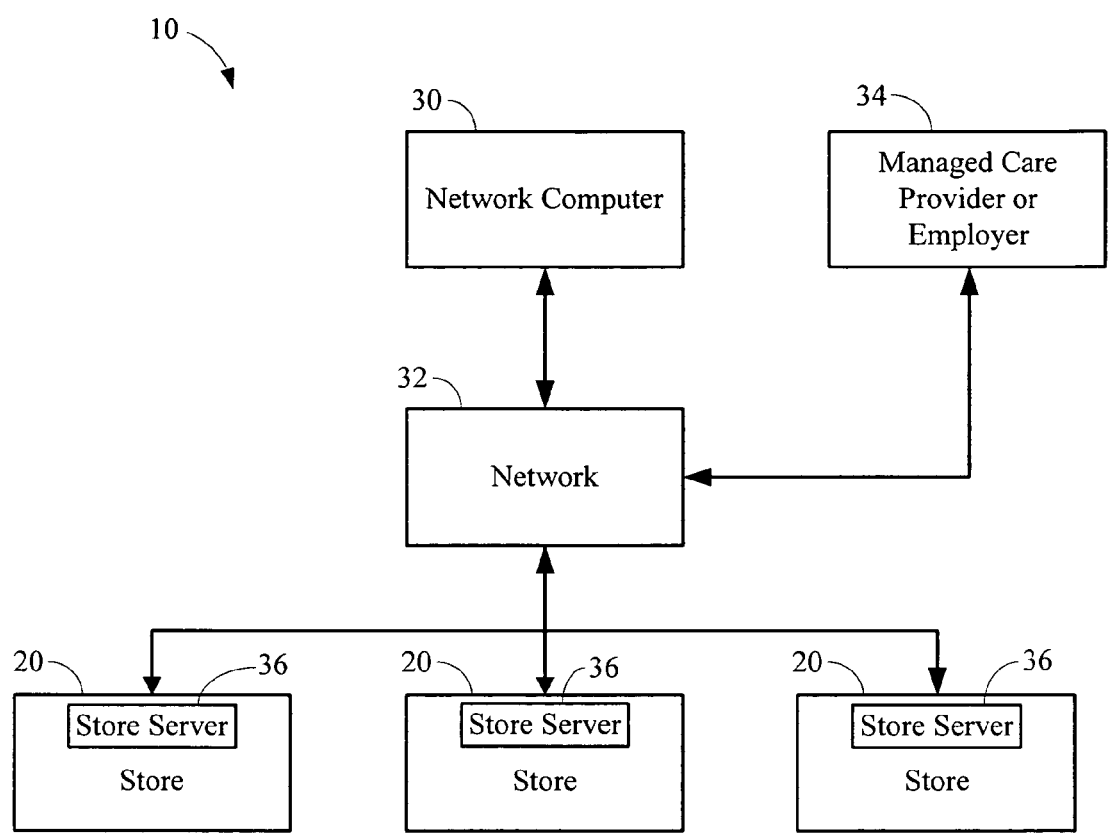
FIG. 1 is a block diagram of an embodiment of an intelligent network system.

FIG. 1 illustrates an embodiment of a data network 10. Referring to FIG. 1, the data network 10 may include a first group of stores or facilities 20 operatively coupled to a network computer or machine 30 via a network 32. The plurality of stores 20 may be located, by way of example rather than limitation, in separate geographic locations from each other, in different areas of the same city, or in different states. Also, the stores 20 may be affiliated with a single entity or with multiple entities. The network computer or machine 30 may be connected to a managed care provider or employer 34 via the network 32. The managed care provider may provide periodic benefits to its members via an OTC benefit card and the employer may provide periodic benefits to its employees via a Flex benefit card. The Flex benefit card may be associated with, for example, a flexible spending account that is set up by an employee/customer. The network 32 may be provided using a wide variety of techniques well known to those skilled in the art for the transfer of electronic data. For example, the network 32 may comprise dedicated access lines, plain, ordinary telephone lines, satellite links, combinations of these, etc. Additionally, the network 32 may include a plurality of network computers or server computers (not shown), each of which may be operatively interconnected in a known manner. Where the network 32 comprises the Internet, data communication may take place over the network 32 via an Internet communication protocol.

The network computer 30 may be a server computer of the type commonly employed in networking solutions, and it may also have a data structure into which customer account data is retained. The network computer 30 may be used to accumulate, analyze, and download data relating to the operation of the stores 20 and more particularly to benefit balances associated with customers' accounts. For example, the network computer 30 may periodically receive data from each of the stores 20 indicative of transactions using benefit cards to purchase store items. This information may be added to the customer's account to assist in determining an available amount of benefit money that remains available to the customer for the purchase of items from the retail store. The customer account data may also be modified, deleted, etc. This information may be accumulated and periodically transferred to the managed care provider 34 via the network 32. Data may also be transferred from the managed care provider 34 to the network computer 30 via the network 32. The stores 20 may include one or more store servers 36 that may be utilized to store customer account information that includes discounts available to the customer when he or she uses their benefit card to purchase store items. For example, customers may be given a 5% discount on any item purchased from the retailer using the customer's benefit card.

Although the data network 10 is shown to include one network computer 30, one managed care provider 34, and three stores 20, it should be understood that different numbers of computers and stores may be utilized. For example, the network 32 may include a plurality of network computers 30, a plurality of managed care providers 34, and hundreds or thousands of stores 20, all of which may be interconnected via the network 32. According to the disclosed example, this configuration may provide several advantages, such as, for example, enabling near real time uploads and downloads of information as well as periodic uploads and downloads of information. This provides for a primary backup of all the information generated in transactions where products are sold, discounts are calculated and given, and benefit cards are used.

Figure 2:
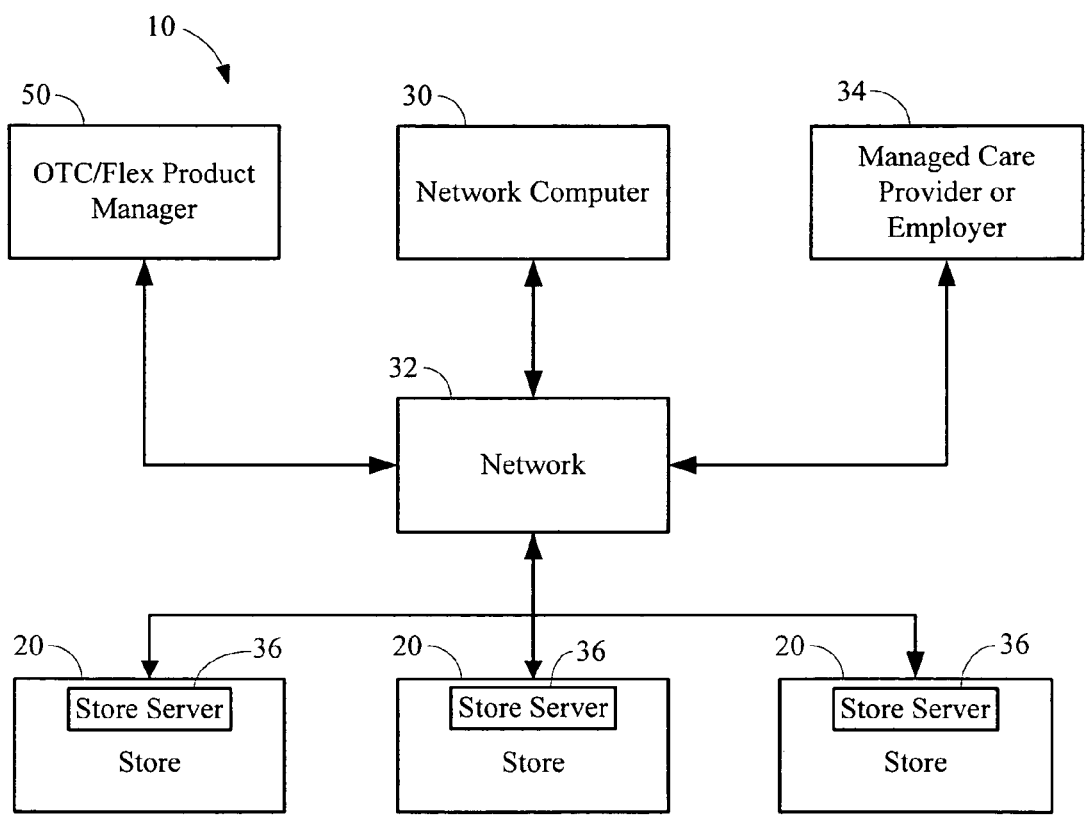
FIG. 2 is a block diagram of an alternative embodiment of an intelligent network system that includes a separate OTC/Flex Product Manager.

FIG. 2 illustrates an alternative embodiment of the network 10 shown in FIG. 1, wherein an OTC/Flex product manager 50 is used to manage the benefits and/or discounts given to customers. The OTC/Flex product manager 50 is shown separately in FIG. 1, but could be a functional entity implemented on the network computer 30, or elsewhere. The embodiment of FIG. 2 is similar to the embodiment shown in FIG. 1 and includes many of the same structures and components. For clarity, the structures and components remaining the same are shown with like reference numbers as those from FIG. 1. Referring to FIG. 2, the OTC/Flex Product Manager 50 may be linked to the network 32 so that data may be transferred between the OTC/Flex Product manager 50 and the network computer 30, the stores 20 and the managed care provider or employer 34.

The OTC/Flex Product Manager 50 may be used as a repository to store benefit account balances and transaction data for customers and other entities. In addition to storing customers' benefit account balances, the OTC/Flex product manager 50 may also be used to calculate the appropriate discount to give to a customer for a specific transaction as well as storing a list of products that are eligible for purchase with the benefit card. The OTC/Flex product manager 50 may be an unrelated third party, or it may be a subsidiary or division of the retailer.

Figure 3:
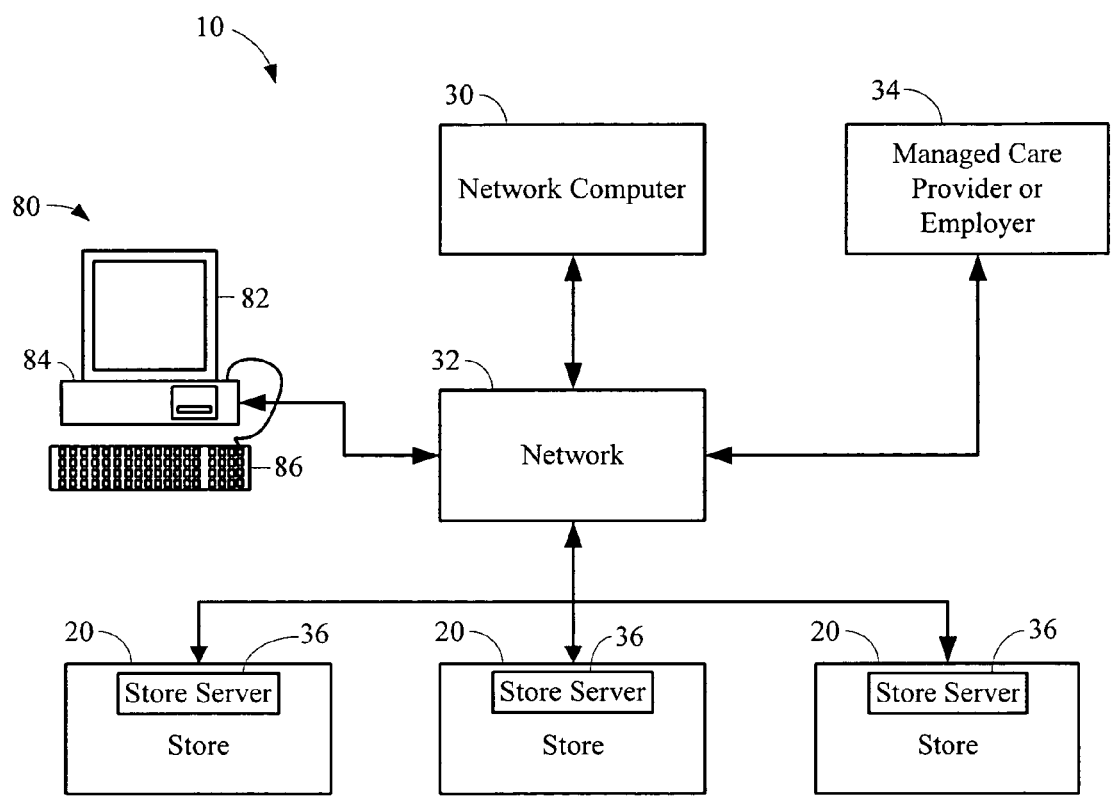
FIG. 3 is a block diagram of an alternative embodiment of an intelligent network system that includes a client device.

FIG. 3 illustrates an alternative embodiment of the network 10 shown in FIG. 1, wherein a client device 80 is linked to the network 32 to enable a customer to order goods from a retailer using the client device 80. The embodiment of FIG. 3 is similar to the embodiment shown in FIGS. 1 and 2 and includes many of the same structures and components. For clarity, the structures and components remaining the same are shown with like reference numbers as those from FIGS. 1 and 2.

Referring to FIG. 3, the client device 80 may be any suitable device for accessing the network 32, such as a computer, PDA, web enabled cell phone, etc., and is shown to include a display 82, a controller 84, a keyboard 86, as well as a variety of other input/output devices. The client device 80 may be linked to the network 32 so that a customer may order goods from the retailer without having to physically visit one of the stores 20 to purchase the customer's goods. Further, the customer may still use his or her benefit card and receive discounts from the retailer, even though the customer purchased the goods from the client device 80. The retailer may provide the customer the option of having the ordered goods shipped to the customer or having the ordered goods made available at a local (or any other) retail store 20 for pickup by the customer.

While the network 10 is shown to include one network computer 30, one managed care provider 34, three stores 20, and one client device 80, it should be understood that different numbers of computers, stores, and client devices may be utilized. For example, the network 32 may include a plurality of network computers 30, a plurality of managed care providers 34, hundreds or thousands of stores 20, and a plurality of client devices 80, all of which may be interconnected via the network 32.

Figure 4:
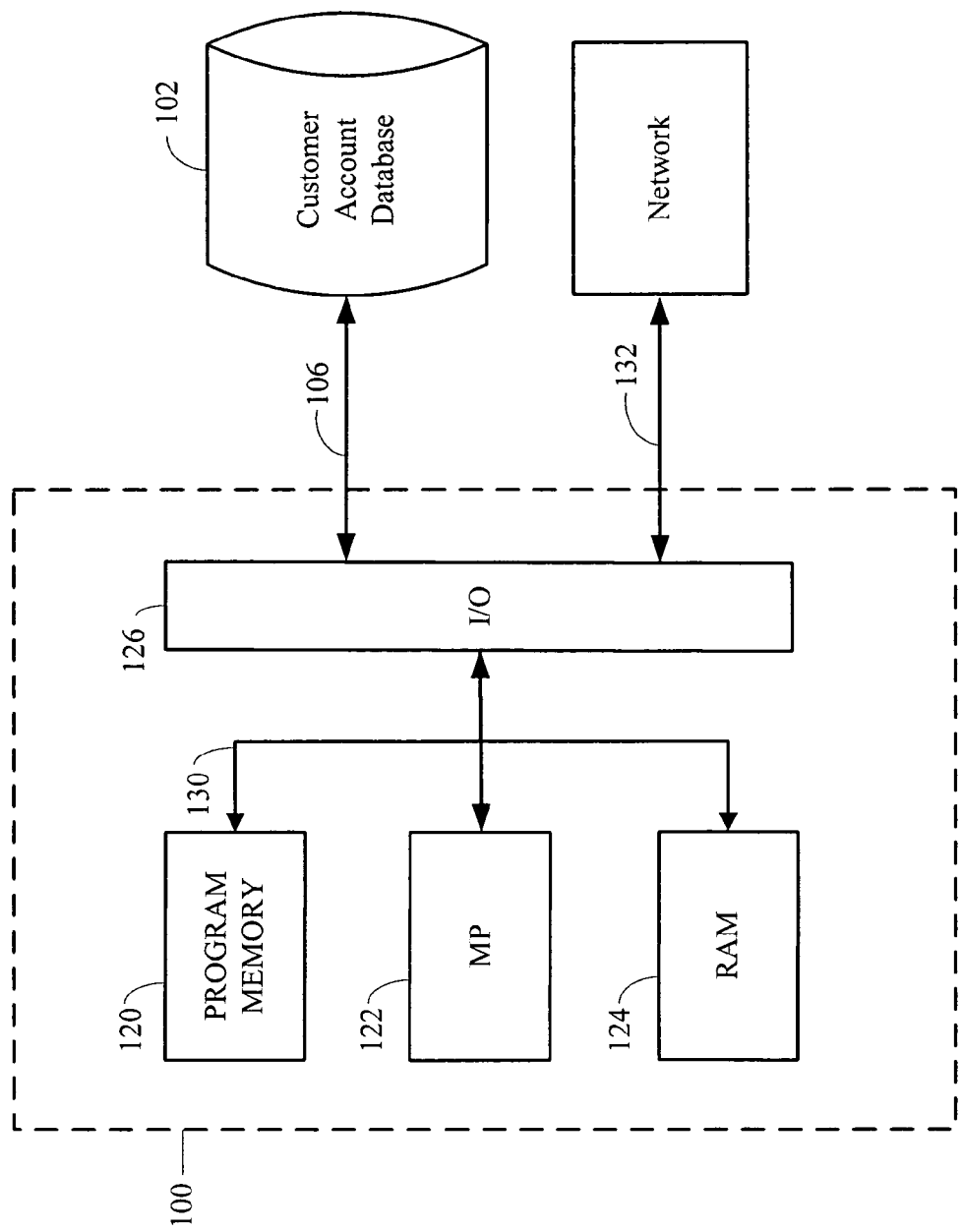
FIG. 4 is a schematic diagram of some of the components of the network computer shown in FIGS. 1, 2, and 3.

FIG. 4 is a schematic diagram of one possible embodiment of the network computer 30 shown in FIGS. 1, 2, and 3. The network computer 30 may have a controller 100 that is operatively connected to a customer account database 102 via a link 106. It should be noted that, while not shown, additional databases may be linked to the controller 100 in a known manner.

The controller 100 may include a program memory 120, a microcontroller or a microprocessor (MP) 122, a random-access memory (RAM) 124, and an input/output (I/O) circuit 126, all of which may be interconnected via an address/data bus 130. It should be appreciated that although only one microprocessor 122 is shown, the controller 100 may include multiple microprocessors 122. Similarly, the memory of the controller 100 may include multiple RAMs 124 and multiple program memories 120. Although the I/O circuit 126 is shown as a single block, it should be appreciated that the I/O circuit 126 may include a number of different types of I/O circuits. The RAM(s) 124 and programs memories 120 may be implemented as semiconductor memories, magnetically readable memories, and/or optically readable memories, for example. All of these memories or data repositories may be referred to as machine-accessible mediums. The controller 100 may also be operatively connected to the network 32 via a link 130.

For the purpose of this description and as briefly discussed above, a machine-accessible medium includes any mechanism that provides (i.e., stores and/or transmits) information in a form accessible by a machine (e.g., a computer, network device, personal digital assistant, manufacturing tool, any device with a set of one or more processors). For example, a machine-accessible medium includes recordable/non-recordable media (e.g., read only memory (ROM); random access memory (RAM); magnetic disk storage media; optical storage media; flash memory devices), as well as electrical, optical, acoustical or other form of propagated signals (e.g., carrier waves, infrared signals, digital signals); etc.

Figure 5:
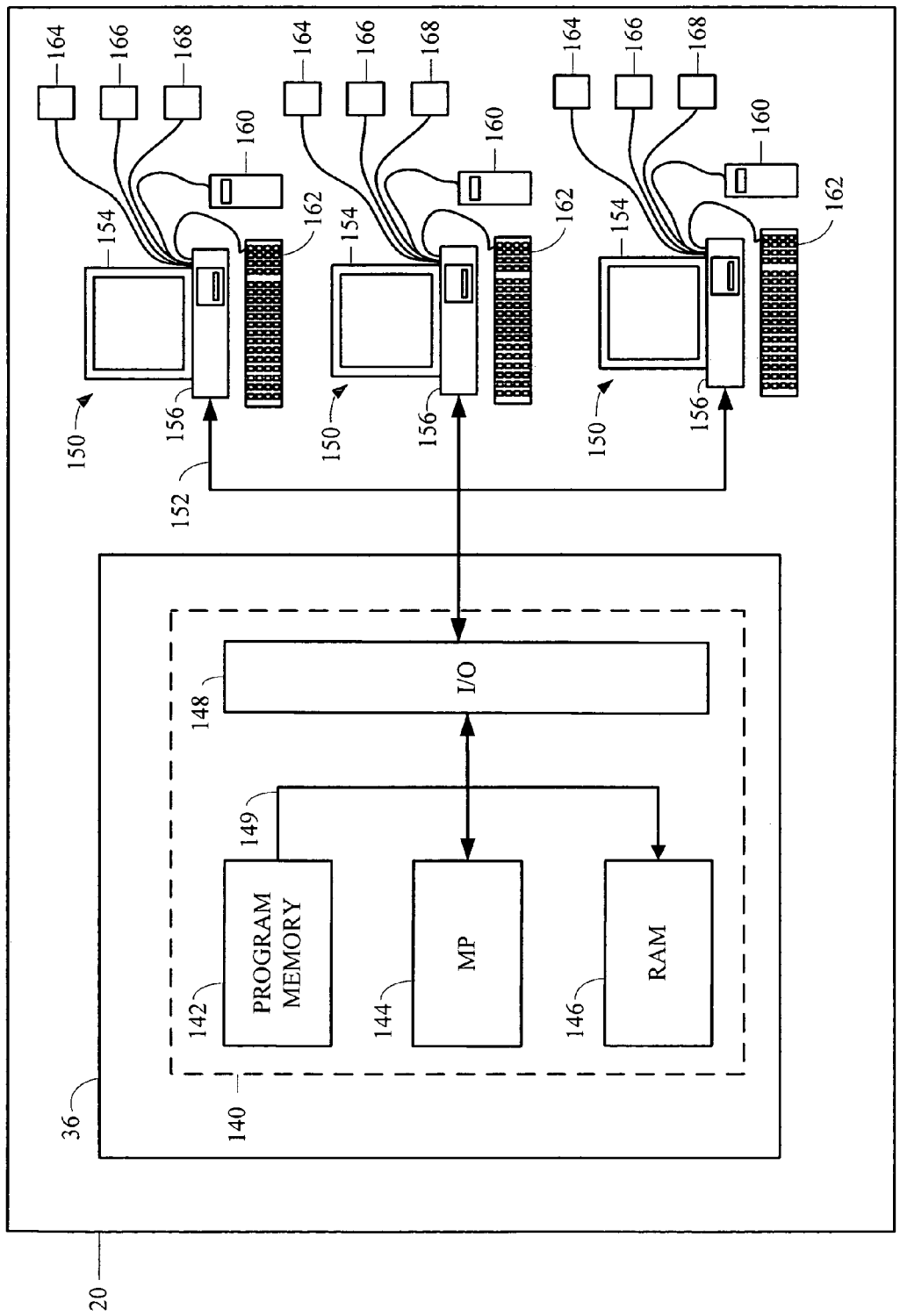
FIG. 5 is a schematic diagram of an embodiment of one of the facilities shown schematically in FIGS. 1, 2, and 3.

FIG. 5 is a schematic diagram of one possible embodiment of several components located in one or more of the stores 20 from FIGS. 1, 2, and 3. Although the following description addresses the design of the stores 20, it should be understood that the design of one or more of the stores 20 may be different than the design of other stores 20. Also, each store 20 may have various different structures and methods of operation. It should also be understood that the embodiment shown in FIG. 5 illustrates some of the components and data connections present in a retail store, however it does not illustrate all of the data connections present in a typical store (i.e., a photo department, a cosmetic department, a pharmacy department, a plurality of front line terminals, etc.). For exemplary purposes, various designs of the stores are described below, but it should be understood that numerous other designs may be utilized.

The store 20 may have a store server 36, which includes a controller 140, wherein the store server 36 is operatively connected to a plurality of point-of-sale (POS) terminals 150 via a network 152. The network 152 may be a wide area network (WAN), a local area network (LAN), or any other type of network readily known to those persons of ordinary skill in the art. The POS terminals 150 may also be operatively connected to the network computer 30 as illustrated in FIGS. 1-3 via the network 32.

Similar to the controller 100 from FIG. 4, the controller 140 may include a program memory 142, a microcontroller or a microprocessor (MP) 144, a random-access memory (RAM) 146, and an input/output (I/O) circuit 148, all of which may be interconnected via an address/data bus 149. As discussed with reference to the controller 100, it should be appreciated that although only one microprocessor 144 is shown, the controller 140 may include multiple microprocessors 144. Similarly, the memory of the controller 140 may include multiple RAMs 146 and multiple programs memories 142. Although the P/O circuit 148 is shown as a single block, the I/O circuit 148 may include a number of different types of I/O circuits. The RAM(s) 146 and programs memories 142 may also be implemented as semiconductor memories, magnetically readable memories, and/or optically readable memories, for example.

The POS terminals 150 may include a display 154, a controller 156, a card reader/writer 160, a keyboard 162, a scanner 164, a printer 166, a customer-side display 168, as well as a variety of other input/output devices such as a mouse, touch screen, track pad, track ball, isopoint, RF device, voice recognition system, etc. Each POS terminal 150 may be signed onto and occupied by a store employee to assist them in performing their duties. Store employees may sign onto a POS terminal 150 using any generically available technique, such as entering a user name and password or an ID card. If a store employee is required to sign onto a POS terminal 150, this information may be passed via the link 152 to the store server 36 so that the controller 140 will be able to identify the signed on store employees and the corresponding POS terminals 150. This may be useful in monitoring the store employees' sales performance.

Typically, store servers 36 store a plurality of files, programs, and other data for use by the POS terminals 150 and the network computer 30. One store server 36 may handle requests for data and updates/creation of data for a number of flexible product purchase accounts for members of a managed care provider from a large number of POS terminals 150. Accordingly, each store server 36 may typically comprise a high end computer with a large storage capacity, one or more fast microprocessors, and one or more high speed network connections. Conversely, relative to a typical store server 36, each POS terminal 150 may typically include less storage capacity, a single microprocessor, and a single network connection.

Overall Operation of the System

One manner in which an exemplary system may operate is described below in connection with a number of flow charts which represent a number of portions or routines of one or more computer programs. As those of ordinary skill in the art will appreciate, the majority of the software utilized to implement the routines is stored in one or more of the memories in the controllers 100 and 140, and may be written at any high level language such as C, C++, C#, Java or the like, or any low-level assembly or machine language. By storing the computer program portions therein, various portions of the memories are physically and/or structurally configured in accordance with the computer program instructions. Parts of the software, however, may be stored and run locally on the terminals 150. As the precise location where the steps are executed can be varied without departing from the scope of the invention, the following figures do not address the machine performing an identified function.

Figure 6A:
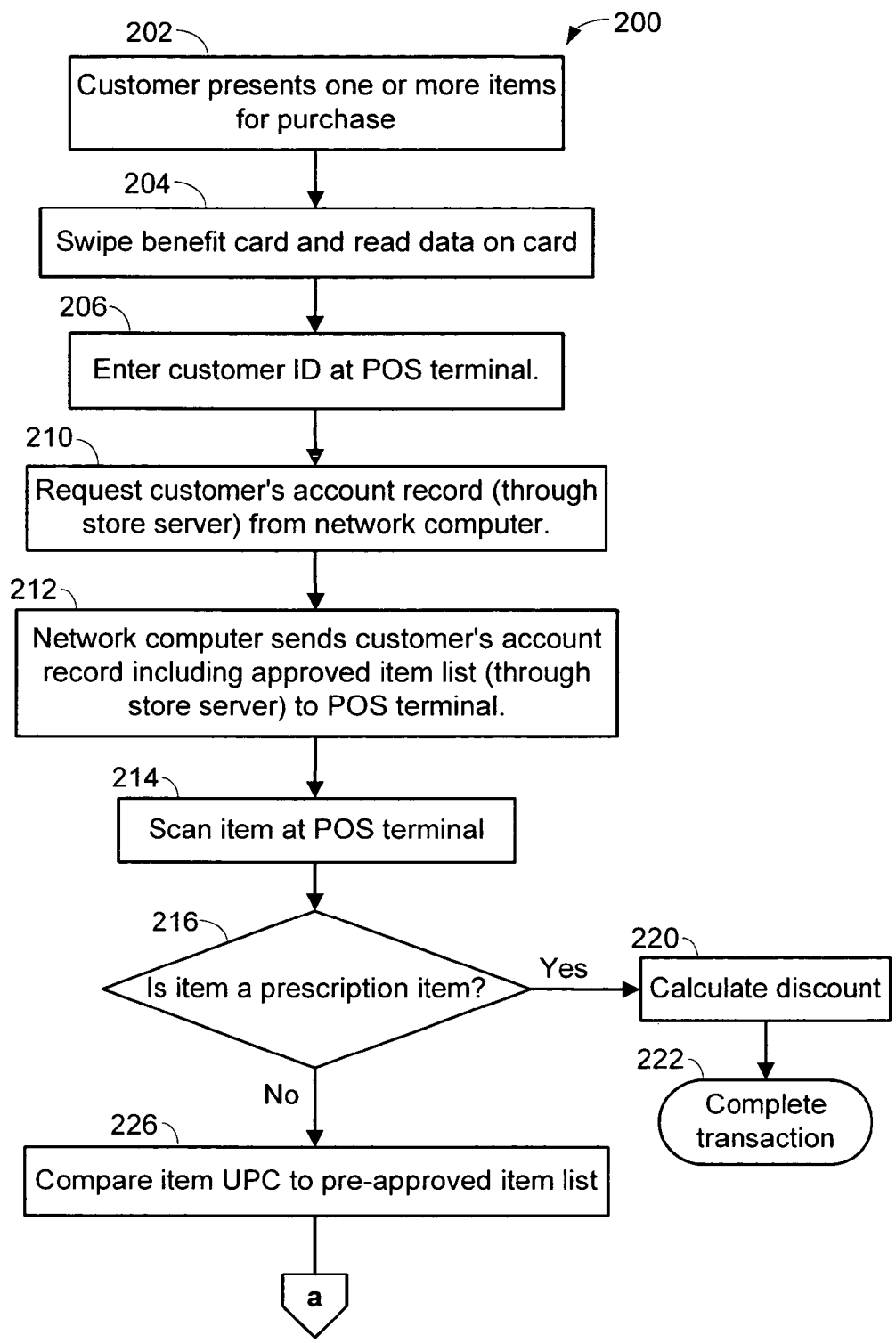
FIGS. 6A and 6B are two parts of a flowchart showing some of the steps used to facilitate the redemption of benefits provided by an employer or a managed care provider to allow an employee or member to purchase items from a retail store with the use of a benefit card.
Figure 6B:
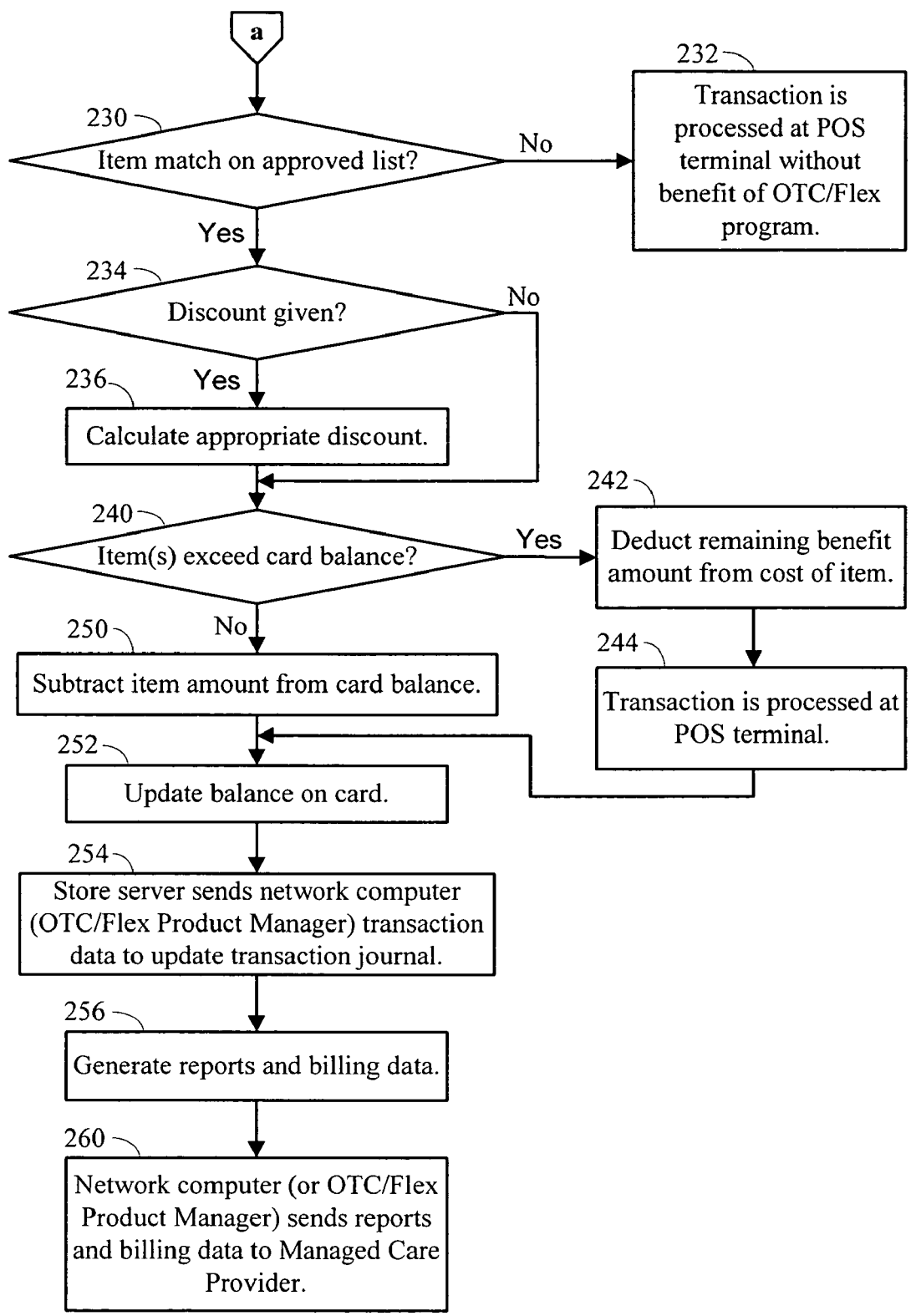

FIGS. 6A and 6B are two parts of a flow chart 200 describing some of the steps used to facilitate the redemption of benefits provided by an employer or a managed care provider to allow an employee or member to purchase items from a retail store with the use of a benefit card. Some of the steps shown in the flowchart 200 may be stored in the memory of the controllers 100 and 140.

Referring to FIG. 6A, the flowchart 200 may begin when a customer presents or orders one or more products for purchase (block 202). A retail store employee may swipe or scan a benefit card in the card reader/writer 160 or scanner 164 at the POS terminal 150 and cause the card reader/writer 160 to read the data on the card (block 204). The data that is read may include a current balance that corresponds to a monetary amount that the customer may use to purchase goods from the retail store. As discussed in more detail with reference to FIGS. 7A and 7B, the data that is read may also include a unique customer ID that has a plurality of alpha characters, numeric characters, or a combination of alpha numeric characters. For example, the customer ID may be a unique sixteen digit number that is assigned to the customer by the retailer or managed care provider.

If the customer ID is not read by the card reader/writer 160, the store employee may enter a customer ID at the POS terminal 150 (block 206) using, for example, the keyboard 162. The customer ID may be located, for example, on the back of the benefit card along with instructions for the store employee. The customer ID may be associated with the customer or someone associated with the customer, the customer's employer or managed care provider, or both. It may also be possible to locate the customer's account using a variety of personal data associated with the customer.

The customer ID may be unique and it may be stored in the retailer's customer account database 102 that is operatively connected to the network computer 30 (See FIG. 4). The customer ID may be associated with a large amount of personal information relating to the customer. For example, the customer account database 102 may store information on the customer's name, address, telephone number, birth date, social security number, insurance providers, benefits data, etc. The customer's personal and any other information may be linked to the customer's customer ID and stored in the customer account database 102 using methods well known to those skilled in the art.

As used herein, the term "benefit card" is intended to include all types of portable storage devices, such as cards, certificates, smart cards, RF type storage devices, and other documents capable of storing or denoting a credit value or an ID by which the value may be derived by look up on a remote database. This definition includes conventional credit card style benefit cards, on which information may be stored, gift cards, phone cards, OCT/Flex cards and smart cards, which may store, process, and update information, among other storage media.

In the exemplary embodiment, the benefit card may be provided in a form similar to that of a conventional credit card. Accordingly, the benefit card may be a generally rectangular, plastic substrate with a magnetic strip for storing information. A bar code may also be utilized to store information on the benefit card. It will be appreciated by those of ordinary skill in the art that the precise shape of, and materials used for the benefit card is not critical and, in fact, any type of portable storage device may be used. For example, the benefit card may be in the form of a key-chain card having a storage means affixed thereto.

Once the customer ID is entered at the POS terminal 150, the store employee may then request the customer's account record by initiating a query of the network computer 30 (block 210). The query initiated at the POS terminal 150 may be transmitted through the store server 36 and the network 32 to the network computer 30. The network computer 30 may cause the controller 100 to perform a search of the customer account database 102 for the customer's customer ID. If the customer's account is located, the network computer 30 may send the customer's account record back across the network 32 to the store server 36 and on to the POS terminal 150 (block 212). It should be noted that the steps associated with the blocks 204 through 212 may be performed at a later point in flowchart 200.

Once the network computer 30 transfers the customer's account record to the store 20, the store server 36 may temporarily store the customer's account record so that retrieval of information or updates to the account record in the near future may be performed locally, thus reducing network traffic. If the customer's account record is not located in the customer account database 102, then the store employee may be prompted to notify the customer accordingly.

The retailer may give the customer the option to access the customer's account record by electronically accessing the retailer's website. Access to the retailer's web-site may be made available via the Internet, where a customer may enter his/her customer ID to access his/her account record for a variety of reasons. For example, if the benefit card is used in conjunction with flex benefits, the customer may want to modify the amount deducted from his or her paycheck to increase or decrease the amount credited to the customer's benefit card (or account).

For another example, if the benefit card is associated with an Over The Counter benefit plan, the customer may want to check his or her balance or obtain a list of available products that may be purchased with the benefit card. The customer may access the internet using the client device 80 from FIG. 3, and the retailer's web-site may be stored on the network computer 30 or any other acceptable server that is connected to the network 32. Alternatively, the customer may be given a mail-in account update form so that the customer may complete the mail-in form and send it to the retailer to update or obtain information corresponding to his/her account.

Still referring to FIG. 6A, the retail employee may process the sale of goods for the transaction (block 214) by, for example, scanning a bar code located on the goods or on the packaging for the goods with the use of a scanner or other input device operatively connected to the controller 140 of the POS terminal 150, by manually entering the stock keeping unit (SKU) for the good on the keyboard 162 operatively connected to the controller 140, or any other method well known to those skilled in the art.

After scanning the item at the POS terminal 150, the system 200 may determine at a block 216 if the item is a prescription item. If it is determined that the item is a prescription item, the system 200 may calculate an appropriate discount on the item if one is available (block 220), and the transaction may then be completed (block 222). In the exemplary embodiment of FIG. 6A, the benefit card is not used to purchase items that are prescription goods, because these are typically, although not always, paid for or reduced based on the customer's managed care provider and the applicable health insurance plan.

If it is determined at the block 216 that the item is not a prescription item, the system 200 may compare the item SKU to a pre-approved item list to determine if the customer may purchase the item with the benefit card (block 226). The pre-approved item list is a list of items that the managed care provider has identified as items that its members may purchase with their benefit cards. For example, the managed care provider may be very restrictive in its list of approved items and only allow its members to purchase OTC drugs with their benefit cards. Alternatively, the managed care provider may not be very restrictive in its list of approved items and allow its member to purchase anything sold by the retail store. The managed care provider may be also be somewhere in the middle of the two previous examples and allow, for example, its members to purchase anything sold by the retail store except alcohol and tobacco products, or any other restricted categories of goods. This pre-approved list may follow the same principles if the benefit card is associated with a flex spending program, except that it is likely the employer that prepares the pre-approved list in this scenario.

As shown in FIG. 6B, if it is determined at a block 230 that the item did not match an item on the pre-approved item list, the transaction is processed at the POS terminal 150 without the advantages of using the benefit card (block 232). If it is determined at the block 230 that the item matched an item on the pre-approved item list, the system 200 may then check to see if a discount is available for the purchase at a block 234. The discounts may be variable based on a total volume of purchases made by customers using their benefit cards.

If it is determined at the block 234 that a discount is available for the item, the store server 36 may apply the appropriate discount to the gross sales price for the transaction to determine the net sales price for the transaction (block 236). The net sales price is the amount the customer is required pay the retailer. The store server 36 may then determine at a block 240 if the net sales price exceeds the benefit card balance. If it is determined at the block 234 that a discount is not available, the store server 36 compares the net sales price to the card balance. If the net amount is greater than the balance on the benefit card, the store server 36 may then subtract the net amount from the benefit card balance (block 242) and the difference (i.e., extra amount) may be collected by the retail employee at the POS terminal 150 (block 244). Payment for the transaction may be accomplished using cash, credit or debit card, check, money order, etc.

If it is determined at the block 240 that the net price of the item does not exceed the card balance, the store server 36 may then subtract the net amount from the benefit card balance (block 250). The store server 36 may then update the balance on the benefit card with the assistance of the card reader/writer 160 (block 252). The remaining available balance of the benefit card may be printed on the receipt with the printer 166 or displayed to the customer via the POS terminal or customer-side display 168. The store server 36 may accumulate sales data related to the sale of goods for multiple transactions at the store 20 and transfer that data via the network 32 to the network computer 30 or the OTC/Flex Product Manager 50 (block 254). The transfer of the sales data may occur after each transaction, or it may occur periodically, such as hourly, nightly, weekly, monthly, etc.

The network computer 30 or the OTC/Flex Product Manager 50 may update the customer account database 102 with the latest sales data from the store 20. The retailer's network computer 30 or the OTC/Flex Product Manager 50 may record the discounts from the transactions as well as the items purchased by the customers using their benefit cards. Either or both the network computer 30 and the OTC/Flex Product Manager 50 may also periodically generate reports and billing data (block 256) and transfer that data and the reports to the managed care provider 34 via the network 32 or any other acceptable link (block 260).

It should also be noted that a multitude of billing arrangements may be established between the retailer and the managed care provider or employer. For example, the managed care provider (or employer) may provide payment in advance to the retailer for the amounts credited to its members benefit cards or the retailer may bill the managed care provider (or employer) on a periodic basis for the amounts used to purchase items from the retailer using the benefit cards. Other billing arrangements may also be contemplated.

Another item to be noted is the recharging or replenishing of the balances on the customers benefit cards. This may be accomplished in a variety of ways, such as, for example, issuing a new card to each of the managed care provider's members on a periodic basis. Another example would be to update the balance stored on the benefit card with the card reader/writer 160 on a periodic basis.

The retailer may provide the customer access to his/her current benefit card balance through any retail store 20, through a system operatively connected to a toll-free telephone number, or through electronic access to the retailers web-site via the internet. As discussed above the customer may gain access to the retailer's website via the Internet and the client device 80, or through the POS terminal or its attached devices, as shown in FIG. 3.

Figure 7A:
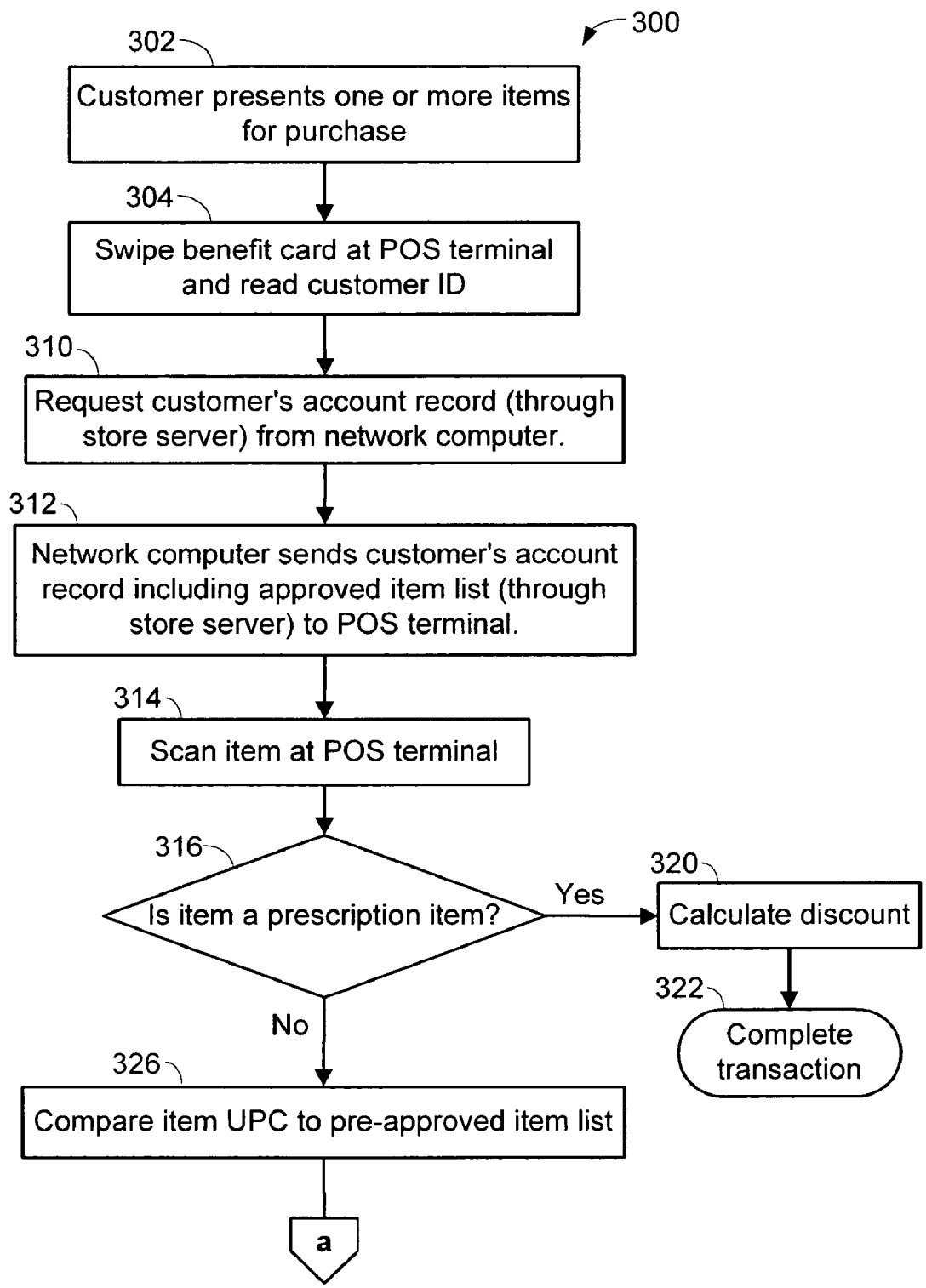
FIGS. 7A and 7B are two parts of a flowchart showing some of the steps used in an alternative embodiment to the embodiment shown in FIGS. 6A and 6B.
Figure 7B:
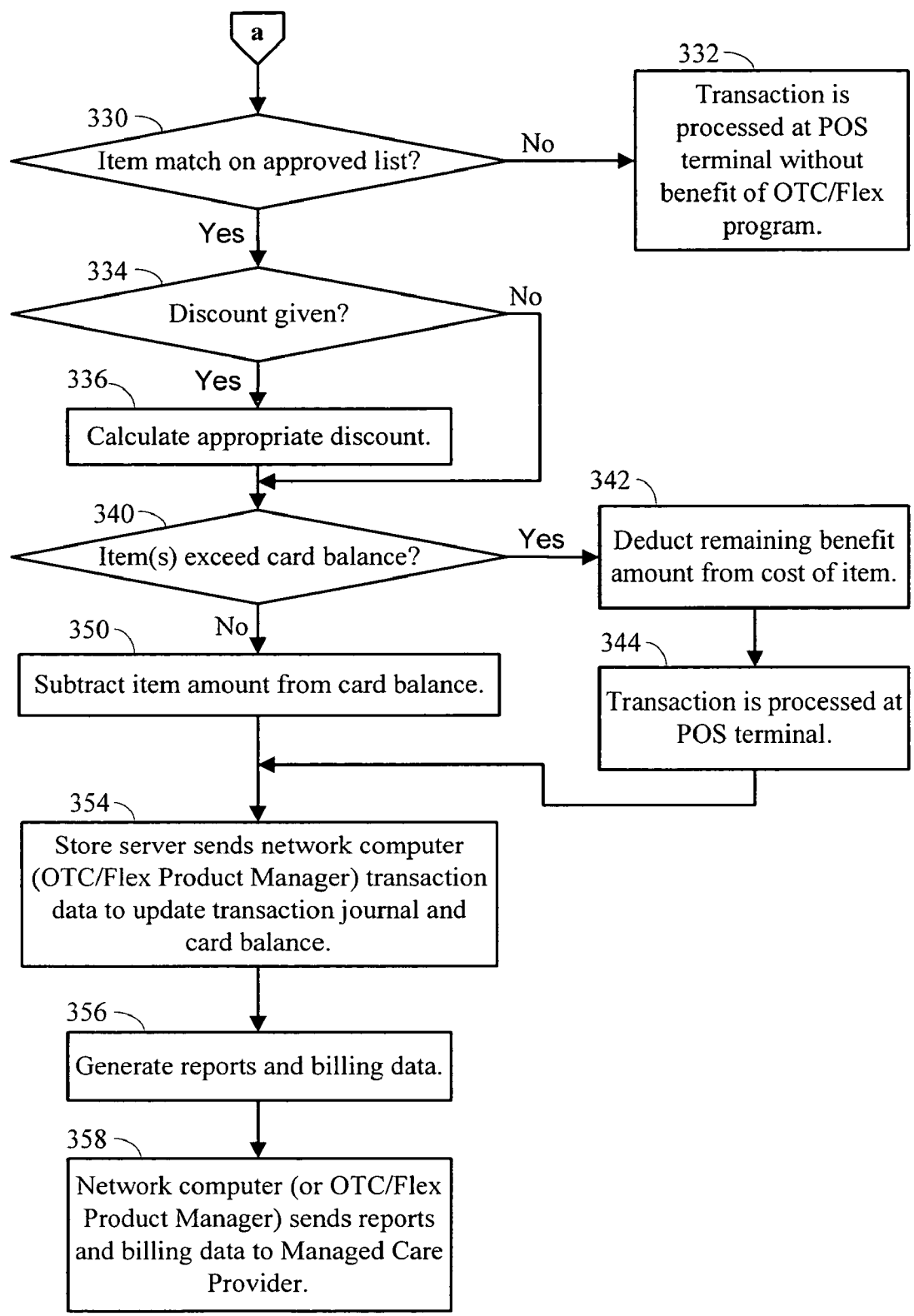

FIGS. 7A and 7B are two parts of a flow chart 300 describing some of the steps used to facilitate the redemption of benefits provided by an employer as flex spending or a managed care provider to allow an employee or member to purchase items from a retail store with the use of a benefit card. The flowchart 300 is similar to the flowchart 200 from FIGS. 6A and 6B except that it does not store the benefit balances on the benefit cards. Some of the steps shown in the flowchart 300 may be stored in the memory of the controllers 100 and 140.

Referring to FIG. 7A, the flowchart 300 may begin when a customer presents or orders one or more products for purchase (block 302). A retail store employee may swipe a benefit card in the card reader/writer 160 at the POS terminal 150 and cause the card reader/writer 160 to read the data on the card (block 304). The data that is read may include a unique customer ID that has a plurality of alpha characters, numeric characters, or a combination of alpha numeric characters. For example, the customer ID may be a unique sixteen digit number that is assigned to the customer by the retailer. The customer ID may be associated with the customer or someone associated with the customer, the customer's employer or managed care provider, or both.

The customer ID may be unique and it may be stored in the retailer's customer account database 102 that is operatively connected to the network computer 30 (See FIG. 4). The customer ID may be associated with a large amount of personal information relating to the customer. For example, the customer account database 102 may store information on the customer's name, address, telephone number, birth date, social security number, insurance providers, benefits data, etc. The customer's personal and any other information may be linked to the customer's customer ID and stored in the customer account database 102 using methods well known to those skilled in the art.

While the retailer, employer, or managed care provider may issue the benefit card to the customer, the customer may not be required to present the benefit card to a store employee in order to obtain access to the customer's account. The retailer may be able to access the customer's account from the customer account database 102 by obtaining other personal information from the customer, such as, for example, the customer's name, social security number, telephone number, etc. In other words, the retailer may be able to access the customer's account by searching fields other than the field for the unique customer ID in the customer account data base 102. The request may be accomplished by sending a query from the POS terminal 150, through the store server 36 or through the POS controller or other in-store network computer and network 32, to the network computer 30. The network computer 30 may then send a response to the query, back through the network 32 and the store server 36, to the POS terminal 150.

These benefits cards may be of conventional credit cards style on which information may be stored. The card may additionally be combined with other cards on the same or different storage media such as gift cards, phone cards, smart cards, all of which may store, process, and update information.

In the exemplary embodiment, the benefit card may be provided in a form similar to that of a conventional credit card. Accordingly, the benefit card may be a generally rectangular, plastic substrate with a magnetic strip for storing information. A bar code may also be utilized to store information on the benefit card. It will be appreciated by those of ordinary skill in the art that the precise shape of, and materials used for the benefit card is not critical and, in fact, any type of portable storage device may be used. For example, the benefit card may be in the form of a key chain card having a storage means affixed thereto.

Once the customer ID is entered at the POS terminal 150, the store employee may then request the customer's account record by initiating a query of the network computer 30 (block 310). Those of ordinary skill in the art will readily appreciate that if the embodiment shown in FIG. 2 is used, the account record and any subsequent sales data may be transmitted between the store server 36 and the OTC/Flex Product Manager 50. For the sake of simplicity, the remainder of this description will focus primarily on systems shown in FIG. 1 that do not include an OTC/Flex Product Manager.

The query initiated at the POS terminal 150 may be transmitted through the store server 36 and the network 32 to the network computer 30. The network computer 30 may cause the controller 100 to perform a search of the customer account database 102 for the customer's customer ID. If the customer's account is located, the network computer 30 may send the customer's account record back across the network 32 to the store server 36 and on to the POS terminal 150 (block 312).

Once the network computer 30 transfers the customer's account record to the store 20, the store server 36 may temporarily store the customer's account record so that retrieval of information or updates to the account record in the near future may be performed locally, thus reducing network traffic. If the customer's account record is not located in the customer account database 102, then the store employee may be prompted to notify the customer accordingly.

The retailer may give the customer the option to access the customer's account record by electronically accessing the retailer's website. Access to the retailer's web-site may be made available via the Internet, where a customer may enter his/her customer ID to access his/her account record for a variety of reasons. For example, if the benefit card is used in conjunction with flex benefits, the customer may want to modify the amount deducted from his or her paycheck to increase or decrease the amount credited to the customer's benefit card (or account).

For another example, if the benefit card is associated with an Over The Counter benefit plan, the customer may want to check his or her balance or obtain a list of available products that may be purchased with the benefit card. The customer may access the internet using the client device 80 from FIG. 3, and the retailer's web-site may be stored on the network computer 30 or any other acceptable server that is connected to the network 32. Alternatively, the customer may be given a mail-in account update form so that the customer may complete the mail-in form and send it to the retailer to perform an update of his/her account.

Still referring to FIG. 7A, the retail employee may process the sale of goods for the transaction (block 314) by, for example, scanning a bar code located on the goods or on the packaging for the goods with the use of a scanner or other input device operatively connected to the controller 140 of the POS terminal 150, by manually entering the stock keeping units (SKU) for the goods on the keyboard 162 operatively connected to the controller 140, or any other method well known to those skilled in the art.

After scanning the item at the POS terminal 150, the system 300 may determine at a block 316 if the item is a prescription item. If it is determined that the item is a prescription item, the system 300 may calculate an appropriate discount (which may be up to 100%) on the item if one is available (block 320), and the transaction may then be completed (block 322). In the exemplary embodiment of FIG. 7A, the benefit card is not used to purchase items that are prescription goods, because these are typically, although not always, paid for or reduced based on the customer's managed care provider and the applicable health insurance plan.

If it is determined at the block 316 that the item is not a prescription item, the system 300 may compare the item SKU to a pre-approved item list to determine if the customer may purchase the item with the benefit card (block 326). The pre-approved item list is a list of items that the managed care provider has identified as items that its members may purchase with their benefit cards. For example, the managed care provider may be very restrictive in its list of approved items and only allow its members to purchase OTC drugs with their benefit cards. Alternatively, the managed care provider may not be very restrictive in its list of approved items and allow its member to purchase anything sold by the retail store. The managed care provider may be also be somewhere in the middle of the two previous examples and allow, for example, its members to purchase anything sold by the retail store except alcohol and tobacco products, or any other restricted categories of goods. This pre-approved list may follow the same principles if the benefit card is associated with a flex spending program, except that it is likely the employer that prepares the pre-approved list in this scenario.

As shown in FIG. 7B, if it is determined at a block 330 that the item did not match an item on the pre-approved item list, the transaction is processed at the POS terminal 150 without the advantages of using the benefit card (block 332). If it is determined at the block 330 that the item matched an item on the pre-approved item list, the system 300 may then check to see if a discount is available for the purchase at a block 334. The discounts may be variable based on a total volume of purchases made by customers using their benefit cards.

If it is determined at the block 334 that a discount is available for the item, the store server 36 may apply the appropriate discount to the gross sales price for the transaction to determine the net sales price for the transaction (block 336). The net sales price is the amount the customer is required pay the retailer. The store server 36 may then determine at a block 340 if the net sales price exceeds the benefit card balance. If it is determined at the block 334 that a discount is not available, the store server 36 compares the net sales price to the card balance. If the net amount is greater than the balance on the benefit card, the store server 36 may then subtract the net amount from the benefit card balance (block 342) and the difference (i.e., extra amount) may be collected by the retail employee at the POS terminal 150 (block 344). Payment for the transaction may be accomplished using cash, credit, debit card, check, money order, etc.

If it is determined at the block 340 that the net price of the item does not exceed the card balance, the store server 36 may then subtract the net amount from the benefit card balance (block 350). The store server 36 may then update the customer's balance associated with the benefit card by transmitting the new balance to the network computer 30. The remaining available balance of the benefit card may be printed on the receipt with the printer 166 or displayed to the customer via the POS terminal 150 or the customer-side display 168. The store server 36 may accumulate sales data related to the sale of goods for multiple transactions at the store 20 and transfer that data via the network 32 to the network computer 30 or the OTC/Flex Product Manager 50 (block 354). The transfer of the sales data may occur after each transaction, or it may occur periodically, such as hourly, nightly, weekly, monthly, etc.

The network computer 30 or the OTC/Flex Product Manager 50 may update the customer account database 102 with the latest sales data from the store 20. The retailer's network computer 30 or the OTC/Flex Product Manager 50 may record the discounts from the transactions as well as the items purchased by the customers using their benefit cards. Either or both the network computer 30 and the OTC/Flex Product Manager 50 may also periodically generate reports and billing data (block 356) and transfer that data and the reports to the managed care provider 34 via the network 32 or any other acceptable link (block 360).

As with the embodiment of FIGS. 6A and 6B, a multitude of billing arrangements may be established between the retailer and the managed care provider or employer. For example, the managed care provider (or employer) may provide payment in advance to the retailer for the amounts credited to its members benefit cards or the retailer may bill the managed care provider (or employer) on a periodic basis for the amounts used to purchase items from the retailer using the benefit cards. Other billing arrangements may also be contemplated.

The retailer may provide the customer access to his/her current benefit card balance through any retail store 20, through a system operatively connected to a toll-free telephone number, or through electronic access to the retailers web-site via the internet. As discussed above the customer may gain access to the retailer's website via the Internet and the client device 80 as shown in FIG. 3.

Figure 8A:
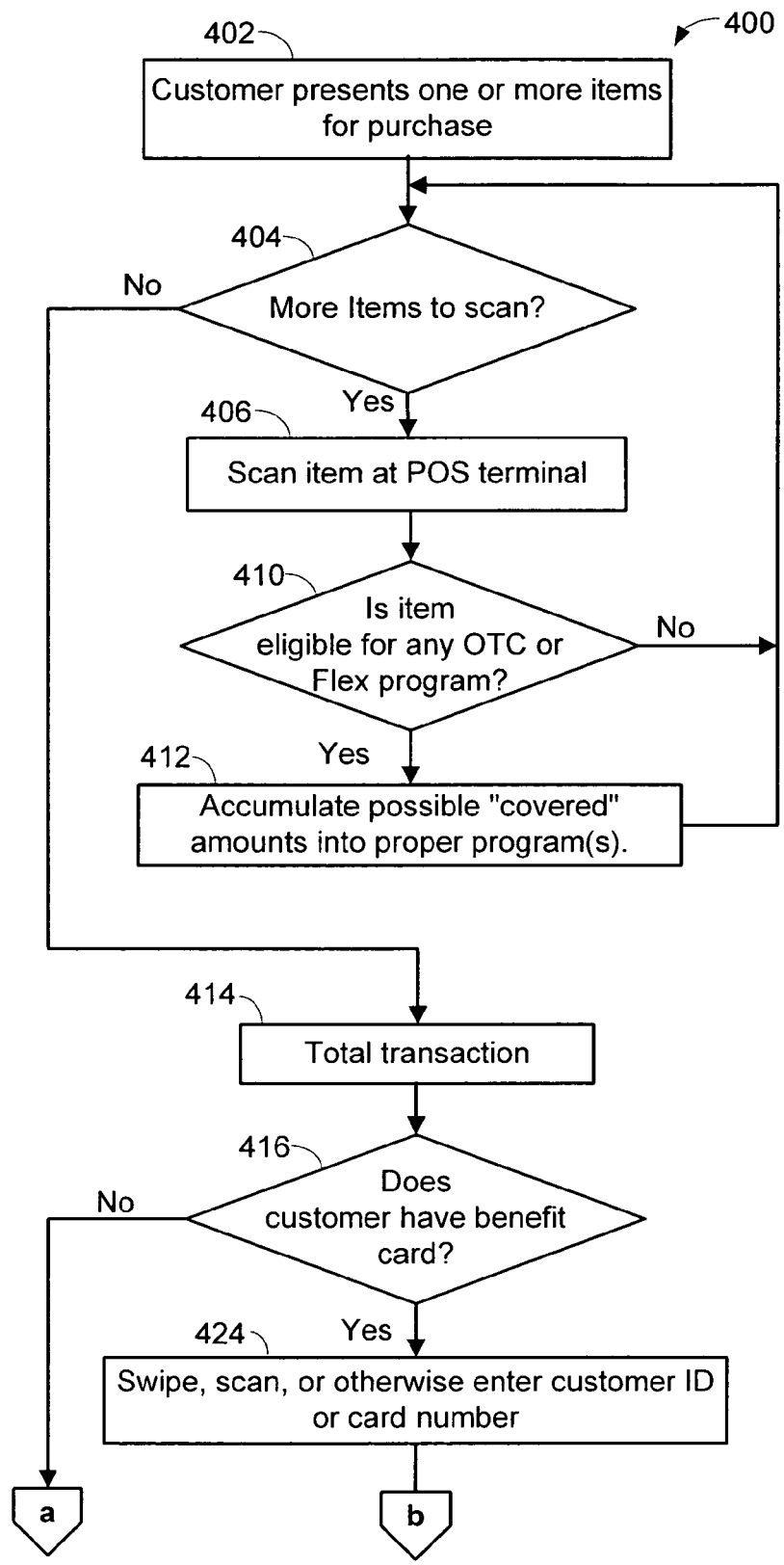
FIGS. 8A and 8B are two parts of a flowchart showing some of the steps used in another alternative embodiment to the embodiment shown in FIGS. 6A and 6B.
Figure 8B:
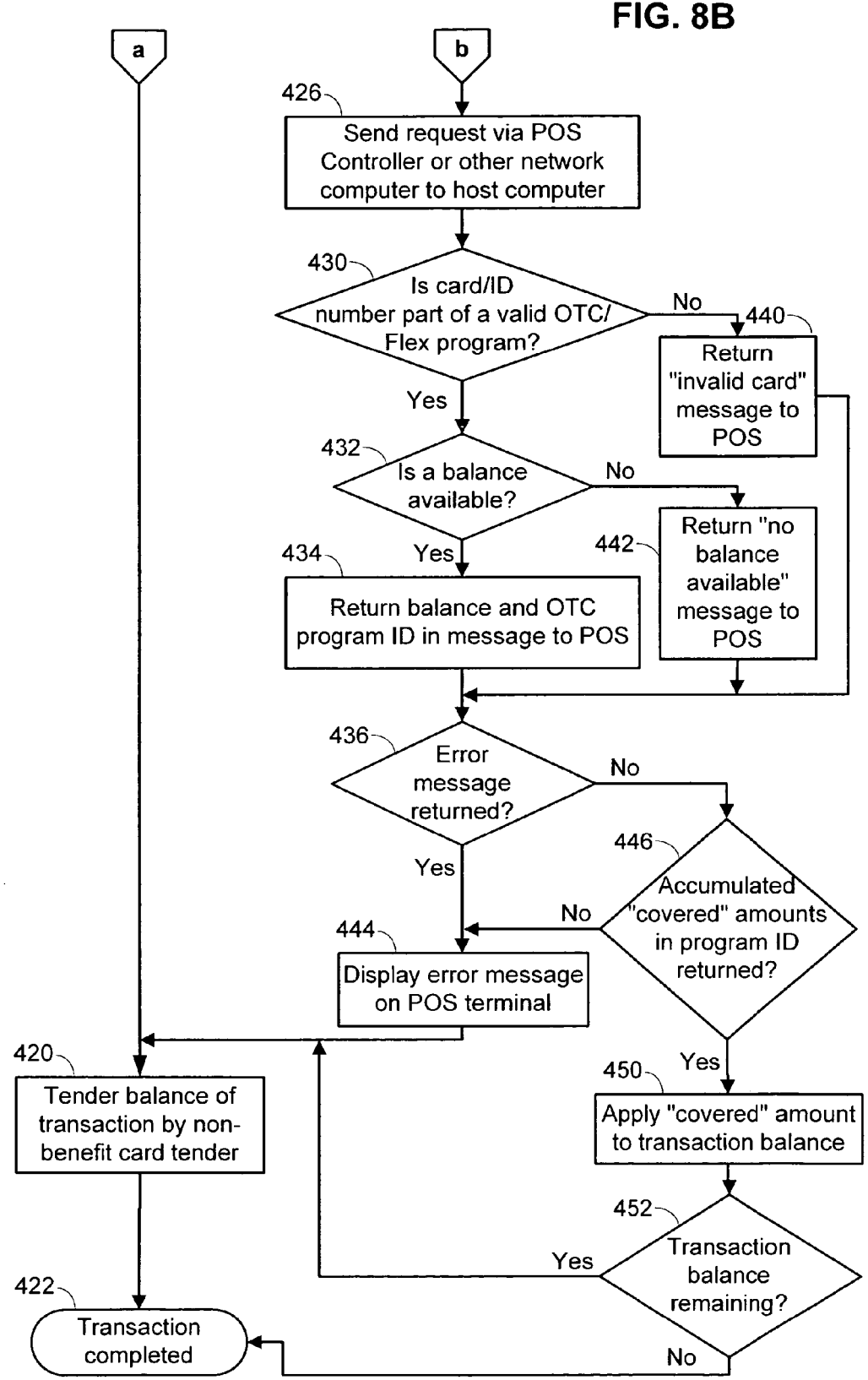

FIGS. 8A and 8B are two parts of a flowchart 400 describing some of the steps used to facilitate the redemption of benefits provided by an employer as flex spending or a managed care provider to allow an employee or member to purchase items, such as, over the counter drugs, from a retail store with the use of a benefit card. The flowchart 400 is similar to the flowcharts 200 and 300 from FIGS. 6A, 6B, 7A, and 7B. Some of the steps shown in the flowchart 400 may be stored in the memory of the controllers 100 and 140.

Referring to FIG. 8A, the flowchart 400 may begin when a customer presents and orders one or more products for purchase (block 402). If it is determined at a block 404 that there are more items to be scanned, the additional item(s) maybe be scanned at the POS terminal 150 (block 406). The routine 400 may then determine if the item(s) are eligible for any Over-The-Counter (OTC) or flex programs (block 410). If the item was not eligible for any OTC or flex program, the routine 400 may return to the block 404 where any additional items may be scanned. If it is determined at the block 410 that the item was eligible for an OTC or flex program, the routine 400 may accumulate possible "covered" amounts into the proper program(s) (block 412). The routine may then return to the block 404.

When it is determined at the block 404 that there are no additional items to be scanned, the routine 400 may total the transaction (block 414), and determine if the customer has a benefit card (block 416). While the routine 400 determines if the customer has a benefit card at block 416 in this embodiment, those of ordinary skill in the art will understand that this step may be performed at any point in the flow of the flowchart 400. In other words, the routine 400 may determine at the beginning if the customer has a benefit card, in the middle, or as one of the last steps in the flowchart 400. If it is determined at the block 416 that the customer does not have a benefit card, the routine 400, as shown in FIG. 8B, may tender the balance of the transaction by a non-benefit card tender, such as cash or credit (block 420). The transaction may then be considered to be completed (block 422).

Referring again to FIG. 8A, if it is determined at the block 416 that the customer does have a benefit card, a retail store employee may swipe the benefit card in the card reader/writer 160 at the POS terminal 150 and cause the card reader/writer 160 to read the data on or from the card (block 424). The data that is read may include a unique customer ID that has a plurality of alpha characters, numeric characters or combination of alpha-numeric characters. For example, the customer ID may be a unique 16-digit number that is assigned to the customer by the retailer. The customer ID may be associated with the customer or someone associated with the customer, the customers' employer or managed care provider, or both.

The customer ID may be unique and it may be stored in the retailers' customer account database 102 that is operatively connected to the network computer 30 (See FIG. 4). The customer ID may be associated with a large amount of personal information relating to the customer. For example, the customer account database 102 may store information on the customer's name, address, telephone number, birth date, social security number, insurance providers, benefits data, etc. The customer's personal and any other information may be linked to the customer's customer ID and stored in the customer account database 102 using methods well known to those or ordinary skill in the art.

While the retailer, employer, or managed care provider may issue the benefit card to the customer, the customer may not be required to present the benefit card to a store employee in order to obtain access to the customer's account. The retailer may be able to access the customer's account from the customer account database 102 by obtaining other personal information from the customer, such as, for example, the customer's name, social security number, telephone number, etc. In other words, the retailer may be able to access the customer's account by searching fields other than the field for the unique customer ID in the customer account data base 102. The request may be accomplished by sending a query from the POS terminal 150, through the store server 36 or through the POS controller or other in-store network computer and network 32, to the network computer 30. The network computer 30 may then send a response to the query, back through the network 32 and the store server 36, to the POS terminal 150.

In the exemplary embodiment, the benefit card may be provided in a form similar to that of a conventional credit card. Accordingly, the benefit card may be a generally rectangular, plastic substrate with a magnetic strip for storing information. A bar code may also be utilized to store information on the benefit card. It will be appreciated by those of ordinary skill in the art that the precise shape of, and materials used for the benefit card is not critical and, in fact, any type of portable storage device may be used. For example, the benefit card may be in the form of a key chain card having a storage means affixed thereto.

Once the customer ID or card number has been entered, and continuing on with FIG. 8B, a request may be sent via the POS controller or other network computer to the host computer (block 426). It may then be determined if the customer associated with the card or ID number is part of a valid OTC/Flex program (block 430). If it is determined at the block 430 that the customer associated with the benefit card/ID is part of a valid OTC/Flex program the routine may check to see if there is a balance available for the account (block 432). If it is determined that a balance is available, the routine 400 may return the balance and the OTC program ID in a message to the POS terminal 150 (block 434).

The routine may then determine if an error message has been returned (block 436). Backing up a bit, if it is determined at the block 430 that the benefit card/ID number was not part of a valid OTC/Flex program, the routine 400 may return an "invalid card/ID number" message to the POS terminal 150 (block 440) and then advance to the block 436 to determine if an error message was returned. If it is determined at the block 432 that a balance was not available for the purchase, the routine may return a "no balance available" message to the POS terminal 150 (block 442) and then proceed to check if an error message was returned (block 436).

If it is determined that the block 436 that an error message was returned, the routine 400 may display an error message on the POS terminal (block 444) and proceed to tender the balance of the transaction by a non-benefit card tender (block 420). If it is determined at the block 436 that no error message was returned, the routine 400 may determine if the accumulated "covered" amounts in a program ID had been returned at a block 446. If it is determined that nothing has been returned or that no covered amounts have been returned, the routine 400 may display an error message on the POS terminal 150 (block 444). If it is determined at the block 446 that accumulated covered amounts in the program ID have been returned, the routine 400 may apply the "covered" amount to the transaction balance (block 450) and determine if there is any balance remaining (block 452). If it is determined at the block 452 that there is no transaction balance remaining, the routine 400 may proceed to the block 422 and consider the transaction completed. If it is determined at the block 452 that a transaction balance is remaining, the routine 400 may tender the balance of the transaction by a non-benefit card tender at the block 420.

It should be noted that the logic to provide the functionality described in the blocks 430, 432, 434, 440, and 442 will most likely reside on the network computer 30. However, those of ordinary skill in the art will understand that the logic associated with those steps, as well as any of the other steps described in flowchart 400 may reside in any of the other computers/controllers connected to the network 32.

Although the technique for providing flex benefits and/or OTC benefits via a benefit card, as described herein, is preferably implemented in software, it may be implemented in hardware, firmware, etc., and may be implemented by any other processor associated with the store and other facilities. Thus, the routine(s) described herein may be implemented in a standard multi-purpose CPU or on specifically designed hardware or firmware as desired. When implemented in software, the software routine(s) may be stored in any computer readable memory such as on a magnetic disk, a laser disk, or other storage medium, in a RAM or ROM of a computer or processor, etc. Likewise, the software may be delivered to a user or process control system via any known or desired delivery method including, for example, on a computer readable disk or other transportable computer storage mechanism or over a communication channel such as a telephone line, the Internet, etc. (which are viewed as being the same as or interchangeable with providing such software via transportable storage medium).

The invention has been described in terms of several preferred embodiments. It will be appreciated that the invention may otherwise be embodied without departing from the fair scope of the invention defined by the following claims.

What is claimed is:

1. A method of facilitating a redemption of a benefit provided by an organization for the purchase of items from a retail store comprising:
   providing a point of sale (POS) terminal within the retail store;
   associating a plurality of items with a list;
   linking a plurality of members with the list, each of the plurality of members having an identification code;
   using the POS terminal to obtain a unique product ID for each item presented at the POS terminal;
   receiving at the POS terminal a benefit card of a member having a unique member ID stored thereon such that, when the benefit card is used, allows the member apply at least a portion of a remaining balance in a benefit account of the member towards the purchase of the items;
   using the POS terminal to obtain the unique member ID stored on the benefit card;
   determining if an item presented for purchase by the member is on the list linked to the member;
   sending from the POS terminal the unique customer ID to a server associated with the retail store;
   aggregating a total amount for the items presented for purchase that are on the list;
   sending an inquiry to a remote computer to determine in substantially real time if the benefit account corresponding to the unique member ID has a sufficient balance to cover the aggregated total of items presented for purchase that are on the list;
   receiving in substantially real time at the POS terminal an indication as to whether the benefit account corresponding to the unique member ID has a sufficient balance to cover the aggregated total of items presented for purchase that are on the list; and
   allowing the member to use the benefit account to pay for the items on the list.

2. The method of claim 1, further comprising determining if the member corresponding to the unique member ID is associated with a valid benefit account.

3. The method of claim 1, wherein the POS terminal is provided separate from a pharmacy system used to obtain prescription goods that are subsidized by the member's health insurance plan.

4. The method of claim 1, wherein the benefit card comprises an OTC benefit card.

5. The method of claim 4, wherein the benefit card comprises a flexible spending account (FSA) card or a health savings account (HSA) card.

6. The method of claim 1, wherein the organization is a managed healthcare provider.

7. A flexible spending account (FSA) redemption system comprising:
   a first retail store at a first location, the first retail store having a point of sale (POS) terminal and a store server;
   a second retail store at a second location, the second retail store having a point of sale (POS) terminal and a store server;
      the first store server having a controller with a processor and a memory operatively coupled to the processor, the memory adapted to store data associated with an FSA benefit program, the FSA benefit program including a list of a plurality of FSA approved items;
      the first retail store POS terminal being programmed to:
         determine if an item presented for purchase by a customer at the first retail store is on the list of approved items linked to the customer;
         receive data associating a customer with the FSA benefit program;
         determine if the customer is associated with the FSA benefit program;
         transmit an inquiry to determine in substantially real time if a benefit account for the customer has a sufficient balance to cover the item presented for purchase on the approved list; and
         receive in substantially real time an indication as to whether the benefit account for the customer has a sufficient balance to cover the item presented for purchase on the approved list;
         and
         accept funds from the benefit account as payment for the item presented for purchase.

8. The benefit redemption system of claim 7, wherein the first store server controller is programmed to send the list of approved items associated with the FSA benefit program to the first store POS terminal.

9. The benefit redemption system of claim 7, further comprising a data repository to store transaction data for the plurality of customers.

10. A method of facilitating a redemption of a flexible spending account (FSA) benefit provided by an organization for the purchase of eligible items from a retail store comprising:
   providing a point of sale (POS) terminal within the retail store;
   associating a plurality of items with a list;
   linking a plurality of members with the list, each of the plurality of members having an identification code;
   using the POS terminal to obtain a unique product ID for each item presented at the POS terminal;
   receiving at the POS terminal an FSA benefit card of a member having a unique member ID stored thereon such that, when the FSA benefit card is used, allows the member to apply at least a portion of a remaining balance in an FSA benefit account of the member towards the purchase of the items;
   using the POS terminal to obtain the unique member ID stored on the FSA benefit card, wherein the POS terminal is provided separate from a pharmacy system used to obtain prescription goods that are subsidized by the member's health insurance plan;
   determining if an item presented for purchase by the member is on the list linked to the member;
   sending from the POS terminal the unique customer ID;
   aggregating a total amount of the items presented For purchase that were on the list;
   sending an inquiry to a remote computer to determine in substantially real time if the FSA benefit account corresponding to the unique member ID has a sufficient balance to cover the aggregated total of items presented for purchase on the list, wherein the remote computer is not associated with a pharmacy benefits manager;
   receiving in substantially real time at the POS terminal an indication as to whether the FSA benefit account corresponding to the unique member ID has a sufficient balance to cover the aggregated total of items presented for purchase on the list; and
   allowing the member to use the FSA benefit account to pay for the items.

11. A health savings account (HSA) redemption system comprising:
- a first retail store at a first location, the first retail store having a point of sale (POS) terminal and a store server;
- a second retail store at a second location, the second retail store having a (POS) terminal and a store server;
- the first store server having a controller with a processor and a memory operatively coupled to the processor, the memory adapted to store data associated with an HSA benefit program, the HSA benefit program including a list of a plurality of HSA approved items;
- the first retail store POS terminal being programmed to:
  - determine if an item presented for purchase by a customer at the first retail store is on the list of approved items linked to the customer;
  - receive data associating a customer with the HSA benefit program;
  - determine if the customer is associated with the HSA benefit program;
  - transmit an inquiry to determine in substantially real time if a benefit account for the customer has a sufficient balance to cover the item presented for purchase on the approved list; and
  - receive in substantially real time an indication as to whether the benefit account for the customer has a sufficient balance to cover the item presented for purchase on the approved list;
  - and
  - accept funds from the benefit account as payment for the item presented for purchase.

12. A method of facilitating a redemption of a flexible spending account (FSA) or health savings account (HSA) benefit prodded by an organization for the purchase of items from a retail store comprising:
- providing a point of sale (POS) terminal within the retail store;
- associating a plurality of items with a list;
- linking a plurality of members with the list, each of the plurality of members having an identification code;
- using the POS terminal to obtain a unique product ID for each item presented at the POS terminal;
- receiving at the POS terminal a benefit card of a member having a unique member ID stored thereon such that, when the benefit card is used, allows the member to apply at least a portion of a remaining balance in a benefit account of the member towards the purchase of the items on the list;
- using the POS terminal to obtain the unique member ID stored on the benefit card;
- determining if an item presented for purchase by the member is on the list linked to the member;
- sending from the POS terminal the unique customer ID;
- aggregating a total amount for the items presented for purchase that are on the list;
- aggregating a total amount for the items presented for purchase that are not on the list;
- sending an inquiry to a remote computer to determine in substantially real time if the benefit account corresponding to the unique member ID has a sufficient balance to cover the aggregated total of items presented for purchase that are on the list;
- receiving in substantially real time at the POS terminal an indication as to whether the benefit account corresponding to the unique member ID has a sufficient balance to cover the aggregated total of items presented for purchase that are on the list;
- allowing the member to use the benefit account to pay for the items on the list; and
- receiving an alternative form of payment for the aggregated total amount for the items presented for purchase not on the list.

* * * * *